May 16, 1950     J. LOXHAM     2,507,727
LINEAR-DIMENSION GAUGE OR COMPARATOR
Filed Jan. 18, 1947     2 Sheets-Sheet 2
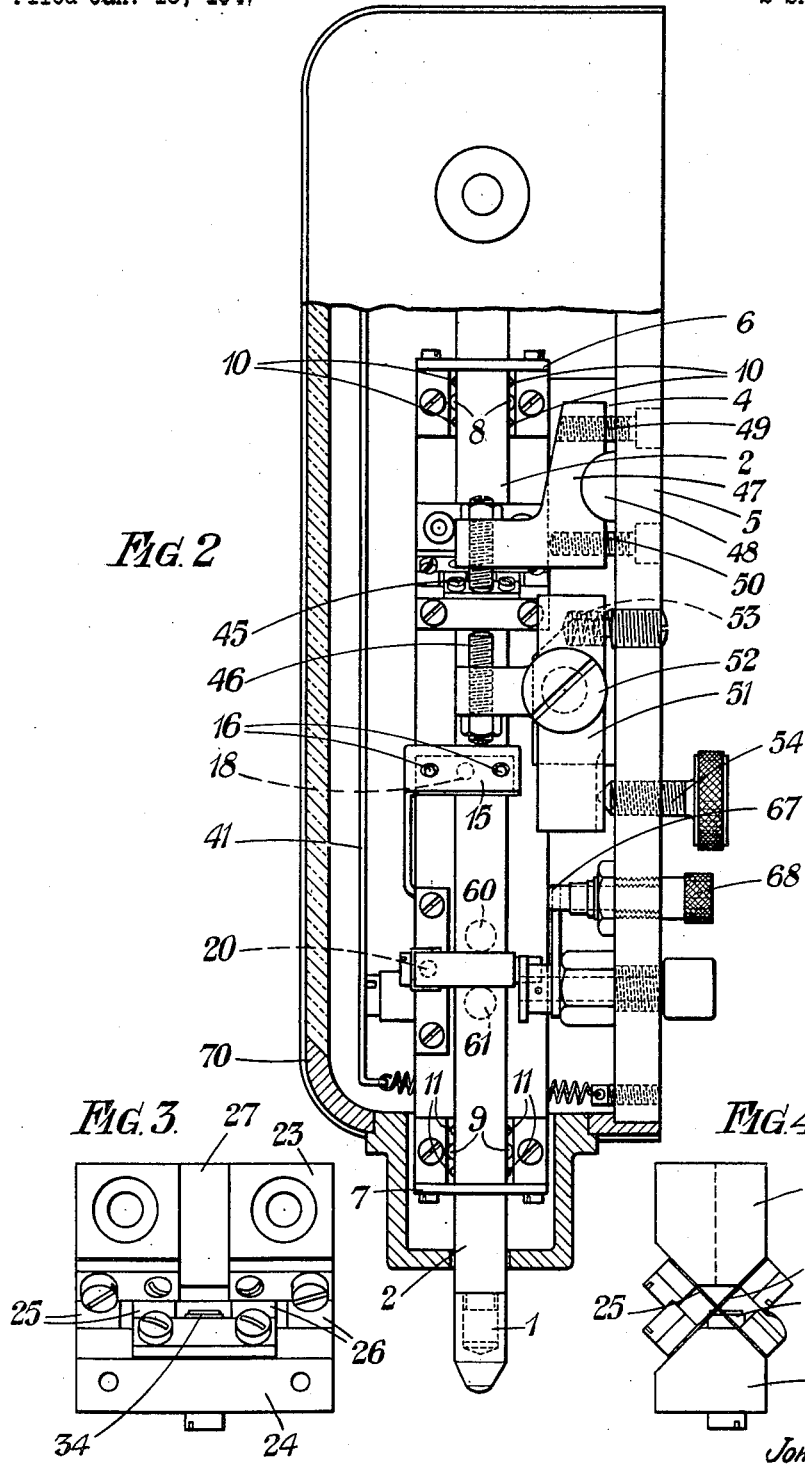
Inventor
JOHN LOXHAM
By Haseltine, Lake & Co.
Attorneys Patented May 16, 1950

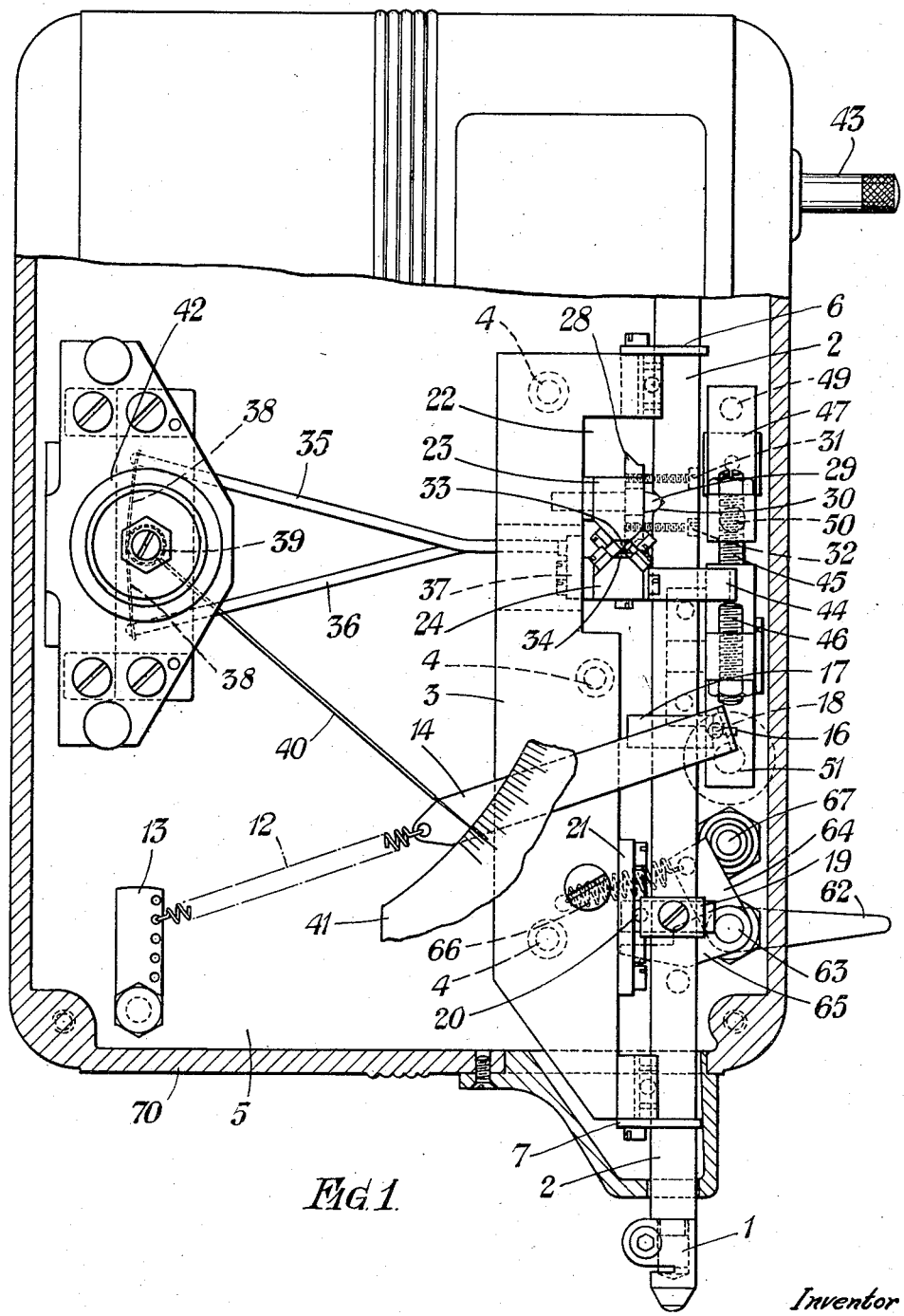

2,507,727

UNITED STATES PATENT OFFICE 2,507,727

LINEAR-DIMENSION GAUGE OR COMPARATOR

John Loxham, Letchworth, England, assignor to The Sigma Instrument Company Limited, Letchworth, England, a British company Application January 18, 1947, Serial No. 722,775
In Great Britain November 26, 1946

4 Claims. (Cl. 33—172)

This invention relates to linear dimension gauges or comparators and is concerned with an improvement in the instrument forming the subject of my prior United States Letters Patent No. 2,338,190.

An object of the invention is to provide measuring apparatus comprising an anvil supporting element, bearings to permit linear movement of said element according to linear dimensions that are to be gauged, a member disposed and adjacent said element, at least one pair of flexible laths arranged to pivotally support said member the laths being relatively disposed in cruciform manner to afford a pivotal axis for said member at the line of intersection of the cruciform laths, means arranged to move linearly in unison with said element and to transmit such motion to said member thereby to move said member angularly to a corresponding extent, and means for visually indicating the angular movements of said member.

Advantages and other objects of the invention will be apparent from the description and claims that now follow.

To show how the invention can be carried into effect reference will now be made to the accompanying drawings in which, Figure 1 is a sectional elevation of the mechanism of a comparator made in accordance with the invention, Figure 2 is a side sectional view of the mechanism shown in Figure 1 and, Figures 3 and 4 are respectively front and side elevations of a detail of the mechanism shown in the other figures.

For ease of description it is assumed that the invention is applied to a comparator such as that dscribed in my prior United States Letters Patent No. 2,338,190. In the said patent there is described an instrument which essentially consists of a base member carrying a table that is adjustable as regards its height. Supported above the table is mechanism including an anvil intended to contact a work-piece or the like placed upon the adjustable table. The anvil is displaceable and the mechanism serves to indicate the gauging displacements of the anvil. It is in regard to such mechanism that the present invention has been devised, and the mechanism shown in the attached drawings will be found to have numerous details of construction described in the said prior patent.

In the attached drawings the anvil is indicated at 1 and it will be seen that the anvil is attached to an axially movable plunger 2. The plunger is in the form of a cylindrical bar and is carried for axial linear displacements by a massive bed block 3 secured rigidly as by studs 4 to the bed-plate 5 of the mechanism. The block 3 has two brackets 6 and 7 which loosely enclose the plunger 2, and there are two pairs of balls 8 and 9 which lie intermediate the plunger 2 and the adjacent surface members secured to the block 3. The surface members are suitably slotted to accommodate the balls 8 and 9 and there are stops 10 and 11 that prevent the balls from accidental displacement. The plunger 2 is held against the balls 8 and 9 by means of a spring 12 which at one end is anchored to an anchor-piece 13 carried by the bed-plate of the mechanism, and which at its other end is secured to a stirrup 14. As appears best from Fig. 2, the outer end of the stirrup 14 is bent laterally, as at 15, and is formed with a pair of apertures which engage over horns 16 provided on a collar 17 secured to the plunger 2. A ball 18 is positioned in a dimple provided in the collar 17 and contacts with the inner side of the laterally directed portion 15 of the stirrup 14. The effective tension of the spring 12 is thus transmitted from the stirrup 14 through the ball 18 to the plunger 2. To prevent the plunger 2 from having any tendency to rotate about its axis, there is an additional collar 19 fixed to the plunger and serving to carry a ball 20 which engages a surface member 21 carried upon the massive bed block 3.

The bed block 3 is gapped at 22 for the reception of blocks 23 and 24. The block 23 is rigidly secured to the main bed block 3 whilst the block 24 is supported pivotally from the fixed block 23. As will be observed from inspection of Figs. 3 and 4, the blocks 23 and 24 have their adjacent faces chamfered for the reception of the ends of the lath springs 25 and 26 arranged in two pairs. In the illustration of Fig. 4, the block 24 lies vertically below the block 23 and it is to be observed that the lath springs of each of the pairs 25 and 26 lie at right angles to one another, whereby each pair of lath springs when seen in a direction perpendicular to the plane in which the springs flex, appears to have a cruciform arrangement. The upper fixed block 23 is grooved at 27 to accommodate a knife-edge member 28 therein. The groove receives the member 28 loosely and the latter is formed with a laterally projecting portion 29 of semi-cylindrical contour. The portion 29 lies within a V-groove 30 formed in the plunger 2. The portion 29 is adjustably held within the V-groove 30 by set-scews 31 and 32. As is clearly seen from Fig. 1, the set-screws 31 and 32 enter the knife-edge member 28 at points either side of the seating of the portion 29 in the V-groove 30. It will therefore be realised that by tightening, say, the screw 31 and simultaneously slacking the screw 32, the knife-edge member 28 can be caused to perform minute angular adjustments. The actual knife-edge 33 of the member 28 is thus effectively caused to vary its distance from the axis of intersection of the lath spring pairs 25 and 26. The lower movable block 24 carries a contact piece 34 formed from sapphire or any other suitable hard contact surface. The place of contact of the knife-edge 33 with the surface piece 34 is thus rendered adjustable with the aid of the set-screws 31 and 32. As appears from Figure 1, the place of contact is close to the axis of intersection of the cruciform lath spring pairs.

From the description so far given it will be apparent that when the anvil 1 is moved linearly and axially according to gauging movements, the plunger 2 will move in unison being gently constrained by the spring 12 to occupy its lowest position. Assuming for the moment that the knife-edge 33 remains always in contact with the contact piece 34, then as the knife-edge member 28 is displaced in unison with the plunger 2, then the block 24 turns about a pivotal axis corresponding to the axis of intersection of the cruciform lath springs.

It will be appreciated that the fixed and movable blocks 23 and 24 will normally tend to occupy a position where the lath springs 25 and 26 are unflexed. It can thus be arranged that the blocks 23 and 24 tend to occupy normally a position where the block 24 lies vertically below the block 23. It will therefore be obvious that the knife-edge 33 will remain in contact with the contact piece 34 during a downward movement of the plunger 2. In an upward movement of the plunger, the block 24 rocks to follow the knife-edge 33 under the action of any convenient system of gentle bias-weighting. Such bias weighting in the illustrated example is afforded by arms 35 and 36 secured to a bracket 37 attached to the block 24. In the illustrated constructional example, a mechanical type of indicating mechanism to magnify the angular displacements of the block 24 is shown, this mechanism being substantially the same as that described in the aforesaid United States Letters Patent. Briefly, the free end of each arm 35 and 36 has a fine metallic band 38 secured to it, such band passing round a spindle or pulley 39 the free ends of the band being secured to the member 39. A pointer 40 moves in unison with the member 39 and it will be appreciated that as one part of the band is coiled up, the other part is paid out, when there is an angular movement of the arms 35 and 36. The pointer co-operates with a scale-plate 41 which is located upon the boss 42 concentric with the spindle or pulley 39. The scale-plate 41 is itself adjustable about the boss 42 by means of an adjusting head 43. The mechanism for securing this adjustment can be of any known kind, and can for example be that described in the specification of the aforesaid United States Letters Patent.

It will in general be desirable to limit the extent of angular movement of the movable block 24. For this purpose a bracket 44 is secured to the block such bracket being of U-shape. Stop-screws 45 and 46 are intended to co-operate with the bracket 44, a carrier member 47 being provided to support the screw 45. The member 47 has a semi-cylindrical hollow that fits over a semi-cylindrical element 48, and there are set-screws 49 and 50 which control the angular disposition of the member 47 in relation to the element 48. Thus the screw 45 may be adjusted to any desired position. The screw 46 is carried by a member 51 that is pivotally supported from the bed-plate 5. The pivotal support is indicated at 52 and on one side of the pivot a light spring 53 holds the member 51 into contact with an adjusting screw 54 possessing a control head external to the bed-plate 5. It will be readily appreciated that by turning the control head the member 50 may be rocked about its pivotal support 52 and may thereby adjust the position of the screw 46.

In order to limit the extent of linear movement of the plunger 2, stops 60 and 61 are provided upon the adjacent side of the bed block 3 such stops being engageable by the collar 19. An external lever 62 is provided for the purpose of manually lifting the plunger 2. The lever 62 is carried upon a pivot 63 and serves to actuate two levers 64 and 65. The lever 65 is formed with an outer end for engaging under a portion of the collar 19 so that when the lever 62 is depressed the lever 65 lifts the plunger 2 through the collar. A spring 66 attached to the lever 64 tends always to return the lever 62 to its inoperative position. The lever 64 serves also to engage a limiting stop 67. The latter can be withdrawn with the aid of an external control head 68. It will be appreciated that the mechanism described is contained in a suitable housing such as that indicated at 70. The housing may carry dead pointers for the purpose of indicating limits of tolerance of error as described in the aforesaid United States Letters Patent.

In the description above, it is shown how the angular movements of the block 24 may be mechanically applied with magnification to the pointer 40. It will at once be realised that the particular form of mechanism used to move the pointer 40 (viz., the band 38 and member 39) does not separately constitute a novel feature of the invention. Any other known form of mechanical or optical indicating and magnifying mechanism or apparatus could be employed.

I claim:

1. Measuring apparatus comprising a support, an anvil-supporting element, bearings in the support to permit linear movement of said element relatively to the support according to linear dimensions that are to be gauged, a member disposed adjacent said element, two spaced pairs of flexible laths, the individual laths of each pair of which are adjacently disposed in cruciform manner whilst one end of each of all the laths is fixed to the support and the other end secured to said member whereby the latter can pivotally move about an axis coinciding with the line of intersection of the said laths, a contact piece carried by said member at a location between said spaced pairs of laths and positioned with its contact face substantially in a plane containing said axis, a knife-edge device secured to said element to experience the linear movements thereof and to contact said contact piece near to said axis thereby causing large angular movements of said member for relatively small linear movements of said element, and means associated with said member for visually indicating the angular movements thereof and also for ensuring that said member tends always to turn in a direction such that the knife-edge and contact piece remain in contact.

2. Measuring apparatus according to claim 1, in which the said member hangs from said laths and has at least one arm secured to it, such arm extending away from said member transversely of the direction of movement of the element and at its far extremity being connected to operate said means for visually indicating the angular movements of said member, the weight of said arm acting to tend always to turn said member in the direction for maintaining contact between the contact member and knife-edge.

3. Measuring apparatus according to claim 1 and in which said knife-edge device consists of a knife-edge carrier having a protruding portion with a rounded face for location in a recess formed in said element, and two screws which anchor said portion in said recess, said screws being threaded into the carrier on either side of such portion to permit the carrier to be adjustably held in various positions reached by the rocking of the carrier about the rounded face of the said protruding portion.

4. Measuring apparatus according to claim 1 further comprising means operatively connected to said member for adjustably limiting the angular extent of its travel.

J. LOXHAM.

REFERENCES CITED

The following references are of record in the file of this patent:

UNITED STATES PATENTS

| Number | Name | Date |
|---|---|---|
| 1,982,161 | Gurney | Nov. 27, 1934 |
| 2,338,190 | Loxham | Jan. 4, 1944 |
| 2,348,018 | Moore | May 2, 1944 |

FOREIGN PATENTS

| Number | Country | Date |
|---|---|---|
| 163,585 | Switzerland | Nov. 1, 1933 |